(12) United States Patent
Esposito et al.

(10) Patent No.: US 10,385,754 B2
(45) Date of Patent: Aug. 20, 2019

(54) METHOD AND APPARATUS FOR MONITORING FLOW RESISTANCE IN AN EXHAUST AFTERTREATMENT SYSTEM

(71) Applicant: GM GLOBAL TECHNOLOGY OPERATIONS LLC, Detroit, MI (US)

(72) Inventors: Raffaele Esposito, Siano (IT); Alberto Giordano, Robilante (IT)

(73) Assignee: GM Global Technology Operations LLC, Detroit, MI (US)

( * ) Notice: Subject to any disclaimer, the term of this patent is extended or adjusted under 35 U.S.C. 154(b) by 204 days.

(21) Appl. No.: 15/384,460

(22) Filed: Dec. 20, 2016

(65) Prior Publication Data

US 2018/0171855 A1    Jun. 21, 2018

(51) Int. Cl.
    *F01N 11/00*       (2006.01)
    *F01N 3/20*        (2006.01)

(52) U.S. Cl.
    CPC .......... *F01N 11/002* (2013.01); *F01N 3/2066* (2013.01); *F01N 2550/24* (2013.01); *F01N 2560/08* (2013.01); *F01N 2900/0601* (2013.01); *F01N 2900/1406* (2013.01); *F01N 2900/1411* (2013.01); *Y02T 10/24* (2013.01); *Y02T 10/47* (2013.01)

(58) Field of Classification Search
CPC ........ F01N 11/00; F01N 3/20; F01N 2260/06; F01N 3/2066
See application file for complete search history.

(56) References Cited

U.S. PATENT DOCUMENTS

| | | | |
|---|---|---|---|
| 2005/0178207 A1* | 8/2005 | Stegmaier | F01N 3/023 73/708 |
| 2013/0138291 A1* | 5/2013 | Liu | F01N 9/002 701/34.4 |
| 2018/0087431 A1* | 3/2018 | Karpe | F01N 3/2066 |

FOREIGN PATENT DOCUMENTS

GB           2504714 A    *   2/2014           F01N 9/002

\* cited by examiner

*Primary Examiner* — Patrick D Maines
(74) *Attorney, Agent, or Firm* — Quinn IP Law

(57) ABSTRACT

An internal combustion engine fluidly coupled to an exhaust aftertreatment system that includes an exhaust purifying device is described. A pressure monitoring device is disposed to monitor a pressure differential between an inlet and an outlet of the exhaust purifying device. A method of monitoring the exhaust purifying device includes monitoring a pressure differential between an inlet and an outlet thereof, and determining an exhaust gas flowrate associated with operation of the internal combustion engine. A raw flow resistance is dynamically determined based upon the pressure differential and the exhaust gas flowrate, and an estimated flow resistance is determined based upon the raw flow resistance. The exhaust purifying device is evaluated based upon the estimated flow resistance.

13 Claims, 4 Drawing Sheets

METHOD AND APPARATUS FOR MONITORING FLOW RESISTANCE IN AN EXHAUST AFTERTREATMENT SYSTEM

INTRODUCTION

Exhaust aftertreatment systems for purifying exhaust gas feedstreams from internal combustion engines are monitored for purposes of control and diagnostics.

SUMMARY

An internal combustion engine is described, and is fluidly coupled to an exhaust aftertreatment system that includes an exhaust purifying device. A pressure monitoring device is disposed to monitor a pressure differential between an inlet and an outlet of the exhaust purifying device. A method of monitoring the exhaust purifying device includes monitoring a pressure differential between an inlet and an outlet thereof, and determining an exhaust gas flowrate associated with operation of the internal combustion engine. A raw flow resistance is dynamically determined based upon the pressure differential and the exhaust gas flowrate, and an estimated flow resistance is determined based upon the raw flow resistance. The exhaust purifying device is evaluated based upon the estimated flow resistance.

An aspect of the disclosure includes subjecting the raw flow resistance to signal filtering by executing a recursive least-square analysis to determine the estimated flow resistance.

An aspect of the disclosure includes detecting removal of the exhaust purifying device based upon the estimated flow resistance.

An aspect of the disclosure includes monitoring the pressure differential between the inlet and the outlet of the exhaust purifying device via a delta pressure sensor, or alternatively via a first pressure sensor disposed upstream relative to the exhaust purifying device and a second pressure sensor disposed downstream relative to the exhaust purifying device.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIGS. 3-1 through 3-4 graphically show exhaust pressure data associated with operation of an internal combustion engine, wherein the data is associated with the method described with reference to FIG. 2 that includes employing a Recursive Least Square (RLS) signal filter to monitor an exhaust purifying device, in accordance with the disclosure.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some or all of these details. Moreover, for the purpose of clarity, certain technical material that is understood in the related art has not been described in detail in order to avoid unnecessarily obscuring the disclosure. Furthermore, the drawings are in simplified form and are not to precise scale. For purposes of convenience and clarity only, directional terms may be used with respect to the drawings. As employed herein, the term "upstream" and related terms refer to elements that are towards an origination of a flow stream relative to an indicated location, and the term "downstream" and related terms refer to elements that are away from an origination of a flow stream relative to an indicated location. These and similar directional terms are not to be construed to limit the scope of the disclosure. Furthermore, the disclosure, as illustrated and described herein, may be practiced in the absence of an element which is not specifically disclosed herein.

Figure 1:
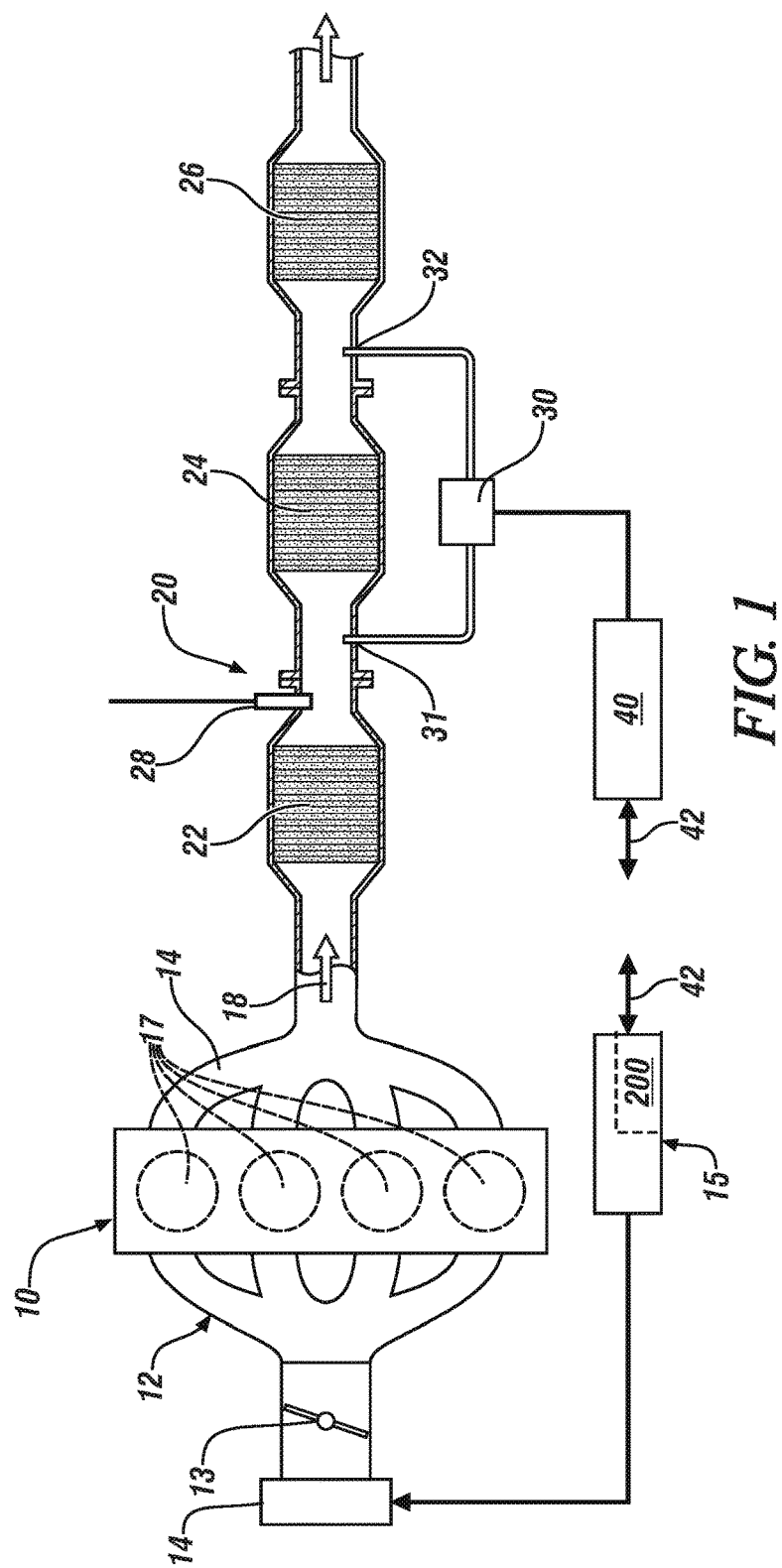
FIG. 1 schematically illustrates an internal combustion engine and associated exhaust aftertreatment system, in accordance with the disclosure.

Referring to the drawings, wherein like reference numerals correspond to like or similar components throughout the several Figures, FIG. 1, consistent with embodiments disclosed herein, schematically illustrates an internal combustion engine (engine) 10 and associated exhaust aftertreatment system 20 that may be disposed to provide propulsion power to a vehicle. The vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The engine 10 includes an engine block that defines a plurality of cylinders 11 that incorporate movable, reciprocating pistons. An intake manifold 12 is disposed to channel intake air to the cylinders 11, and a mass airflow meter 14 is disposed upstream of a throttle 13. The mass airflow meter 14 and the throttle 13 are in communication with a controller 15, which is disposed to monitor signal inputs from the mass airflow meter 14 and communicate commands to the throttle 13 and other engine actuators in response to operator and other system demands. An exhaust manifold 17 is disposed to entrain exhaust gases expelled by the engine 10, which are channeled as an exhaust gas feedstream 18 to the exhaust aftertreatment system 20.

The exhaust aftertreatment system 20 is disposed to include a plurality of exhaust purifying devices, including, by way of a non-limiting example, first, second and third devices 22, 24 and 26, respectively. The first, second and third devices 22, 24 and 26 may be a suitable exhaust purifying devices that are disposed to oxidize, reduce, filter or otherwise treat the exhaust gas feedstream 18 to purify it. In one embodiment, the second device 24 is a selective catalytic reduction (SCR) catalyst. In one embodiment, a reductant injection device 28 is disposed with an inlet portion that is in the exhaust gas feedstream 18 upstream of the second device 24, and is disposed to inject a reductant into the exhaust gas feedstream 18. A pressure monitoring device 30 is disposed to monitor exhaust pressure, and is preferably disposed to monitor a pressure differential across one of the exhaust aftertreatment devices, e.g., the second device 24 as shown. The pressure monitoring device 30 is configured as a pressure differential sensor in one embodiment that is fluidly coupled to a first inlet 31 in the exhaust gas feedstream 18 that is located upstream of the second device 24 and fluidly coupled to a second inlet 32 in the exhaust gas feedstream 18 that is located downstream of the second device 24. The pressure monitoring device 30 generates an electrical signal that can be correlated to a pressure differential between the first and second inlets 31, 32, which is communicated to a controller 40.

The pressure monitoring device 30 described herein is one embodiment of a mechanization to determine a pressure differential across all of or a subset of the devices of the exhaust aftertreatment system 20. Alternatively, two pressure sensors may be disposed to measure the pressures of the exhaust gas feedstream at the first and second inlets 31, 32, with the pressure differential being determined in the controller 40 based upon a difference thereof. Alternatively, the pressure differential may be determined upstream and downstream relative to the first device 22, or upstream and downstream relative to the third device 26, or upstream and downstream relative to a combination of the first and second devices 22, 24, or upstream and downstream relative to a combination of the second and third devices 24, 26, or upstream and downstream relative to all of the devices of the exhaust aftertreatment system 20.

The terms controller, control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or another suitable communication link, and is indicated by lines 42. Communication includes exchanging data signals in suitable form, including, for example, electrical signals via a conductive medium, electromagnetic signals via air, optical signals via optical waveguides, and the like. The data signals may include discrete, analog or digitized analog electrical signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. A parameter is defined as a measurable quantity that represents a physical property of a device or other element that is discernible using one or more sensors and/or a physical model that generates a data signal, wherein the data signal is associated with a state of the parameter. The state of a parameter can have a discrete value, e.g., either "1" or "0", or can be infinitely variable in value over a range. When employed for interpreting a data signal, the terms "calibration", "calibrate", and related terms refer to a result or a process that can be employed to derive an actual or standard state of a parameter from a data signal that represents an observed measurement. By way of a non-limiting example, a calibration can be developed and employed to determine a pressure differential based upon an electrical signal that is output from a differential pressure sensor. A calibration as described herein can be reduced to a storable parametric table, a plurality of executable equations or another suitable form.

Flow resistance describes properties that interfere with the free flow of a fluid, e.g., exhaust gas, in a constrained environment, such as in a pipe of an exhaust aftertreatment system. Flow resistance can be caused by boundary conditions between the walls of the pipe and the exhaust gas. Flow resistance can also be caused by obstructions in the flow channel, such as may be caused by one or more of the aforementioned exhaust devices 22, 24 and 26. Each of the exhaust devices 22, 24 and 26 may be characterized in terms of a magnitude of flow resistance. As such, when the magnitude of flow resistance during engine operation is greater than or less than a characteristic flow resistance for the device, it may provide an indication of a change in circumstances in the exhaust aftertreatment system that may need to be addressed. By way of a non-limiting example, a decrease in the flow resistance may indicate that one or more of the exhaust devices 22, 24 and 26 has been removed. The flow resistance of a specific component can be calculated as follows:

$$R = \frac{\Delta p}{\dot{V}} \quad [1]$$

wherein:
   R is the flow resistance,
   $\Delta p$ is a pressure differential across the device, and
   $\dot{V}$ is a volumetric flowrate.

The flow resistance can be determined based upon the volumetric flowrate and the pressure differential, both which can be dynamically monitored during on-going operation. In one embodiment, the volumetric flowrate can be derived based upon data signals that are input from the mass airflow meter 14, a fuel injection flowrate, exhaust temperature and exhaust pressure, while taking into account transport lag through the engine 10. In one embodiment, the pressure differential can be derived based upon data signals that are input from the pressure monitoring device 30 that can be correlated to the state of the pressure differential parameter.

The data signals associated with each of the parameters can be noisy in use, and may benefit from signal filtering for purposes of analysis. Signal filtering is a form of signal processing that includes removing or reducing magnitude of selected elements from a data signal in order to refine the data signal to more accurately represent the actual measurement. This may include, e.g., high frequency signal elements, low frequency signal elements, or a combination of high and low frequency signal elements.

A method 200 for monitoring an exhaust purifying device that is disposed in an exhaust aftertreatment system for an internal combustion engine is provided. Embodiments of the engine 10 and exhaust aftertreatment system 20 are described with reference to FIG. 1. The method 200 is described with reference to FIG. 2, and may be dynamically executed as one or more algorithms and associated calibrations that are reduced to algorithmic code and implemented in an on-board controller.

Figure 2:
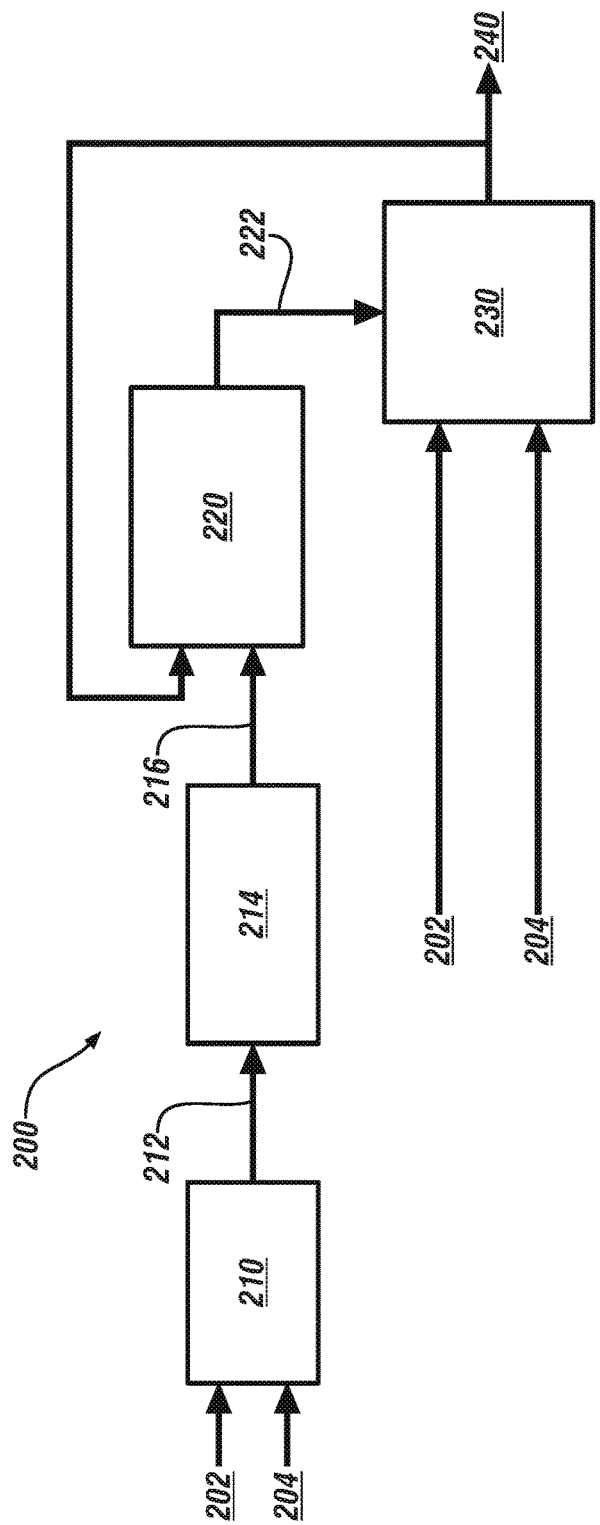
FIG. 2 schematically shows a method that includes employing a Recursive Least Square (RLS) signal filter to monitor an exhaust purifying device that is disposed in an exhaust aftertreatment system for an internal combustion engine, in accordance with the disclosure.

Referring now to FIG. 2, with continued reference to FIG. 1, the method 200 includes dynamically monitoring a pressure differential 202 between an inlet and an outlet of the exhaust purifying device 24 coincident with a dynamic monitoring of the volumetric flowrate 204 of the exhaust gas feedstream 18. The pressure differential 202 and the volumetric flowrate 204 are subjected to a Recursive Least Square (RLS) signal filter 230 to determine an estimated flow resistance 240. The RLS signal filter 230 includes determining a raw flow resistance and subjecting the raw flow resistance to a dynamically adaptive signal filter to determine the estimated flow resistance 240.

In one embodiment, the RLS signal filter 230 employs a Recursive Least Square (RLS) filter for signal estimation. The RLS signal filter 230 is an adaptive filter that recursively finds the coefficients that minimize a weighted linear least squares cost function relating to the input signals. The RLS signal filter 230 can be effectively used for estimating constant parameters of an overdetermined linear equation system, which may be in the following form:

$$y = Hx, \quad [2]$$

wherein:
y represents the measurements [n×1],
H represents the equation coefficients [n×m], and
x represents the unknowns [m×1], wherein "n" represents the quantity of available measurements, and "m" represents the quantity of unknowns.

A control system that is dynamically executing in real-time can obtain results for the unknowns x in EQ. 2 prior to collecting the quantity of n measurements by employing the RLS signal filter 230. This includes determining as follows $$K = PH^T(HPH^T + C)^{-1}$$

$$P = P - KHP \quad [3]$$

wherein:
C represents a measurement noise covariance, which is a [1×1] matrix,
P represents an estimation error covariance, which is a [m×m] matrix,
K represents a correction gain term, which is a [m×1] matrix, and
H represents the equation coefficients, which is a [n×m] matrix.

An embodiment of the RLS signal filter 230 can be applied to estimate the flow resistance based upon a noisy flow resistance that is obtained from signal measurements. For applying the RLS signal filter 230 to the flow resistance problem, employing Eq. 2, the following terms include as follows:
y represents the DPS measurement, which is a [1×1] matrix,
H represents the volumetric flow, which is a [1×1] matrix, and
x represents the flow resistance that is either estimated or filtered, which is a [1×1] matrix.

This results in a governing RLS equation as follows:

$$\hat{x} = \hat{x} + K[y - H\hat{x}] \quad [4]$$

wherein:
y represents the present measurement for the pressure differential Δp across the device, as indicated by the pressure differential 202 in FIG. 2,
$\hat{x}$ represents the estimated flow resistance R, as indicated by element 240,
H represents the presently measured volumetric flowrate $\dot{V}$, as indicated by the volumetric flowrate 204 in FIG. 2, and
K represents a correction gain term.

An algorithm that includes Eq. 4 can be executed recursively during ongoing operation to determine the estimated flow resistance R 240. Considering the dimensions of the various matrices, a division operation can be executed to estimate the flow resistance R 240 without executing a matrix inversion, thus facilitating a simple calculation that can be performed in real-time.

Under certain conditions, operation of the RLS signal filter 230 may need to reset the estimated flow resistance R 240 to an initial value. This preferably includes executing a division operation 210 to determine a present value for the flow resistance 212 based upon a ratio of the pressure differential 202 and the volumetric flowrate 204, and subjecting the present value for the flow resistance 212 to a low pass signal filer 214 to determine an instantaneous filtered flow resistance 216. The instantaneous filtered flow resistance 216 is provided as input to a reset determination element 220, which calculates an absolute error term as a difference between the instantaneous filtered flow resistance 216 and the estimated flow resistance 240. The absolute error term is compared to a maximum threshold value for the flow resistance. So long as the absolute error term is less than the maximum threshold value for the flow resistance, no action is required and the output 222 remains low or "0". When the absolute error term is greater than the maximum threshold value for the flow resistance, the output 222 changes to high, or "1", which signals the RLS 230 to reset the term $\hat{x}$, representing the estimated flow resistance R, to a nominal value, which is pre-calibrated. This allows managing a rapid variation of the flow resistance. When the reset of RLS 230 is triggered, two terms are set to their nominal values, including the state $\hat{x}$ and the estimation error covariance (P).

FIG. 2 is a flow chart illustrating an example method of a vehicle computing system receiving instructions from one or more controllers in communication with the system. The vehicle computing system communicating with the one or more modules may be implemented through a computer algorithm, machine executable code, non-transitory computer-readable medium, or software instructions programmed into a suitable programmable logic device(s) of the vehicle, such as the one or more modules, a server in communication with the vehicle computing system, a mobile device communicating with the vehicle computing system and/or server, another controller in the vehicle, or a combination thereof. Although the various steps shown in the flowchart diagram appear to occur in a chronological sequence, at least some of the steps may occur in a different order, and some steps may be performed concurrently or not at all.

Figures 1, 3:
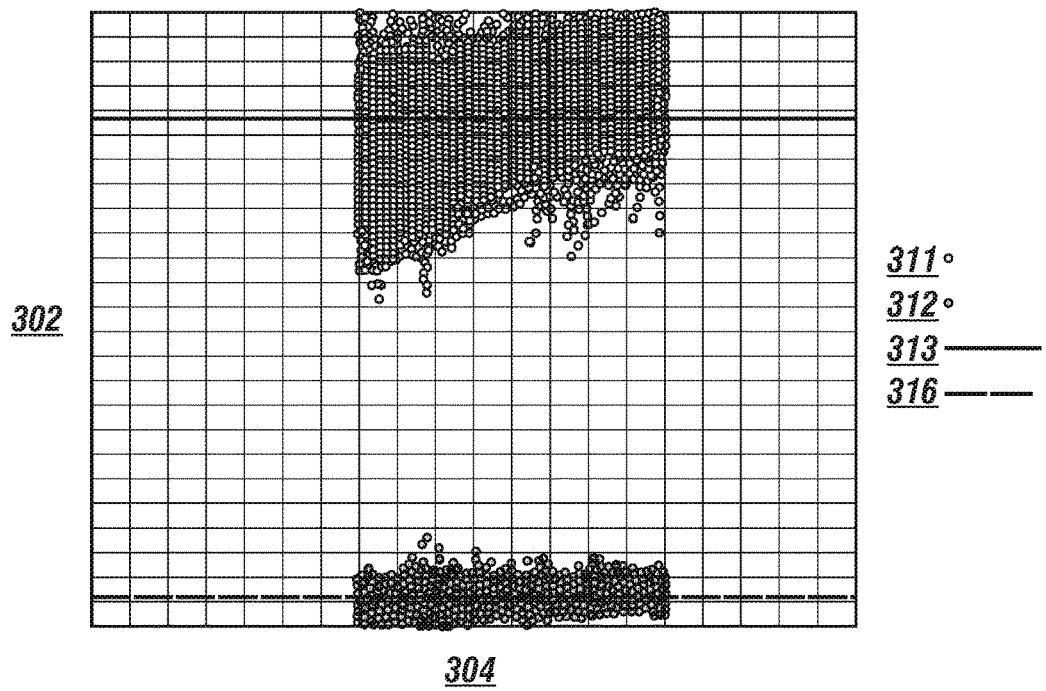
Figures 2, 3:
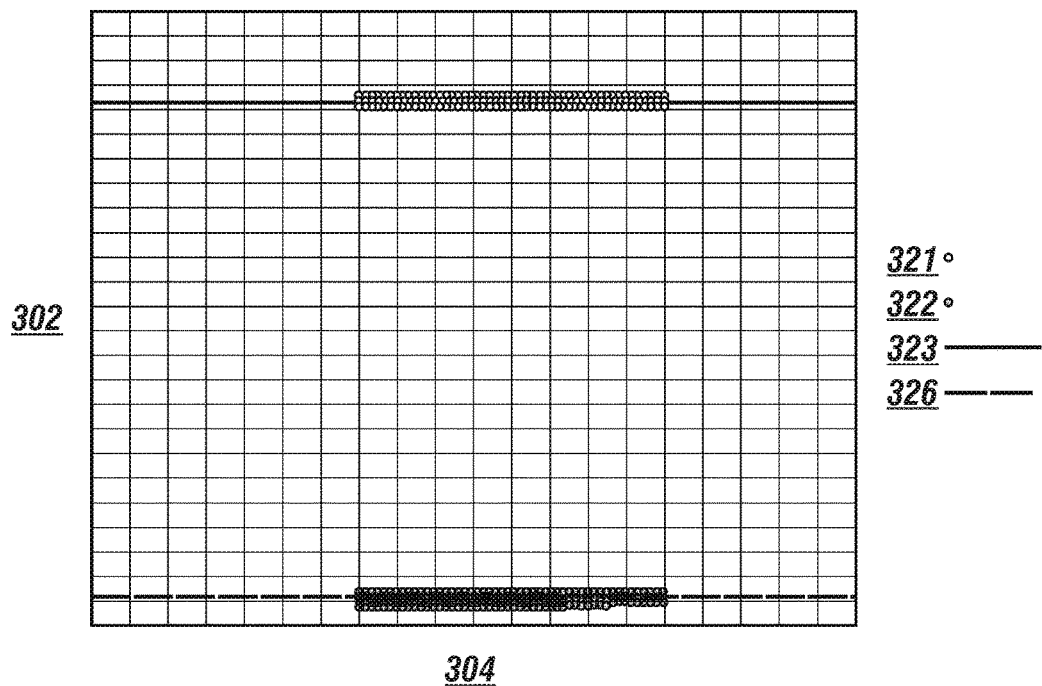
Figure 3:
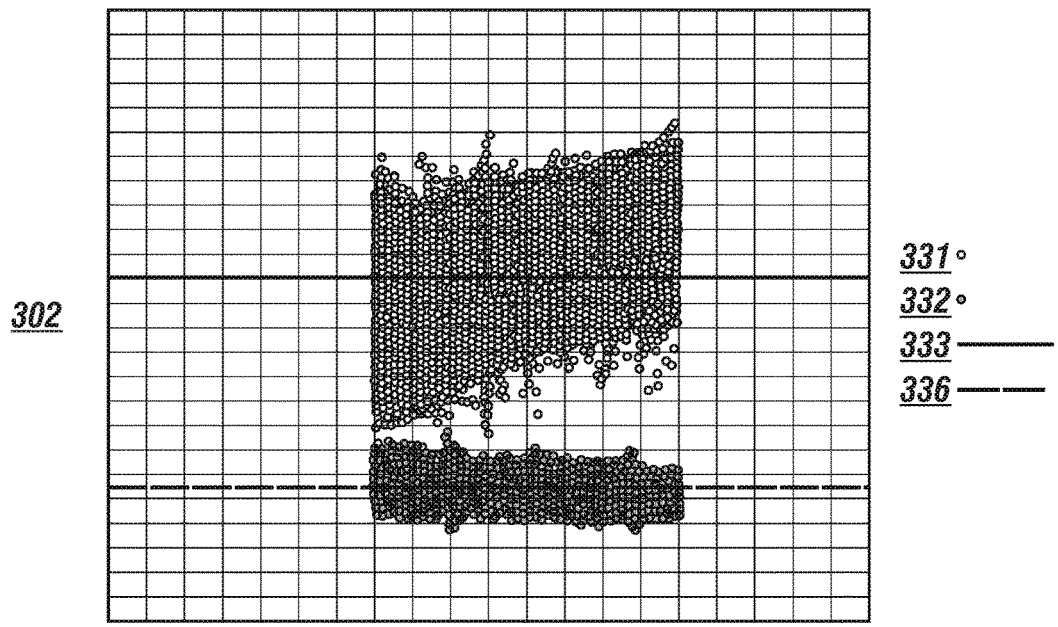

FIG. 3-1 graphically shows a first dataset 311 and a second dataset 312 that indicate a flow resistance (Pa-sec/sec) in relation to exhaust flow (1/sec), wherein the first and second datasets 311, 312 are associated with operation of an embodiment of the engine 10 described with reference to FIG. 1 without benefit of the method 200 including the RLS signal filter 230 that is described with reference to FIG. 2. The first and second datasets 311, 312 are associated with operation of an embodiment of the engine 10 described with reference to FIG. 1 under nominal operating conditions. The first and second datasets 311, 312 represent raw differential pressure data that has been subject to signal filtering such as a low-pass signal filter. The flow resistance (Pa-sec/sec) is shown on the vertical axis 302 and the exhaust flow (1/sec) is shown on the horizontal axis 304. The first dataset 311 is related to measurement of a pressure differential between an inlet and an outlet of one of the first, second or third devices 22, 24 and 26 of the exhaust aftertreatment system 20, wherein the selected device is the second device 24 configured as an SCR catalyst. The second dataset 312 is related to measurement of a pressure differential between an inlet and an outlet of one of the first, second or third devices 22, 24 and 26 of the exhaust aftertreatment system 20, wherein the selected device is the second device 24 configured as a straight pipe, simulating a condition wherein the SCR catalyst has been removed. A first mean value 313 associated with the first dataset 311 is also plotted, along with corresponding first mean value 316 when the second device 24 configured as a straight pipe.

FIG. 3-2 graphically shows a third dataset 321 and a fourth dataset 322 that indicate a flow resistance (Pa-sec/sec) in relation to exhaust flow (1/sec), wherein the third and fourth datasets 321, 322 are associated with operation of an embodiment of the engine 10 described with reference to FIG. 1 employing the method 200 including the RLS signal filter 230 that is described with reference to FIG. 2. The third and fourth datasets 321, 322 are associated with operation of an embodiment of the engine 10 described with reference to FIG. 1 under the same operating conditions as the first and second datasets 311, 312. The third and fourth datasets 321, 322 represent raw differential pressure data that has been subject to the RLS signal filter 230. The flow resistance (Pa-sec/sec) is shown on the vertical axis 302 and the exhaust flow (1/sec) is shown on the horizontal axis 304. The third dataset 321 is related to measurement of a pressure differential between an inlet and an outlet of one of the first, second or third devices 22, 24 and 26 of the exhaust aftertreatment system 20, wherein the selected device is the second device 24 configured as an SCR catalyst. The fourth dataset 322 is related to measurement of a pressure differential between an inlet and an outlet of one of the first, second or third devices 22, 24 and 26 of the exhaust aftertreatment system 20, wherein the selected device is the second device 24 configured as a straight pipe, simulating a condition wherein the SCR catalyst has been removed. A third mean value 323 associated with the third dataset 321 is also plotted, along with corresponding mean value 326 when the second device 24 configured as a straight pipe.

The data indicates that both results have a separation that satisfies a six-sigma difference between a flow resistance that is determined with the second device 24 in place and a flow resistance that is determined with the second device 24 configured as a straight pipe. However, the results indicated by the third and fourth datasets 321, 322 employing the method 200 including the RLS signal filter 230 show significantly more separation than the results indicated by the first and second datasets 311, 312 without the RLS signal filter 230 in place.

FIG. 3-3 graphically shows a fifth dataset 331 and a sixth dataset 332 that indicate a flow resistance (Pa-sec/sec) in relation to exhaust flow (1/sec), wherein the fifth and sixth datasets 331, 332 are associated with operation of an embodiment of the engine 10 described with reference to FIG. 1 without benefit of the method 200 including the RLS signal filter 230 that is described with reference to FIG. 2. The fifth and sixth datasets 331, 332 are associated with operation of an embodiment of the engine 10 described with reference to FIG. 1 under worst-case operating conditions that are associated with the accuracy of the pressure monitoring device 30, which may include low exhaust flow and pressure conditions. The worst case operating conditions take into consideration accuracies of the pressure monitoring device 30, the exhaust temperature sensor, air mass flow sensor and/or other devices that are employed to estimate the exhaust volumetric flow. This includes combining all previous sensor accuracy determinations to determine minimum and maximum flow resistance deviations.

The fifth and sixth datasets 331, 332 represent raw differential pressure data that has been subject to signal filtering such as a low-pass signal filter. The flow resistance (Pa-sec/sec) is shown on the vertical axis 302 and the exhaust flow (1/sec) is shown on the horizontal axis 304. The fifth dataset 331 is related to measurement of a pressure differential between an inlet and an outlet of one of the first, second or third devices 22, 24 and 26 of the exhaust aftertreatment system 20, wherein the selected device is the second device 24 configured as an SCR catalyst. The sixth dataset 332 is related to measurement of a pressure differential between an inlet and an outlet of one of the first, second or third devices 22, 24 and 26 of the exhaust aftertreatment system 20, wherein the selected device is the second device 24 configured as a straight pipe, simulating a condition wherein the SCR catalyst has been removed. A sixth mean value 333 associated with the sixth dataset 332 are also plotted, along with corresponding sixth mean value 336 when the second device 24 configured as a straight pipe.

Figures 3, 4:
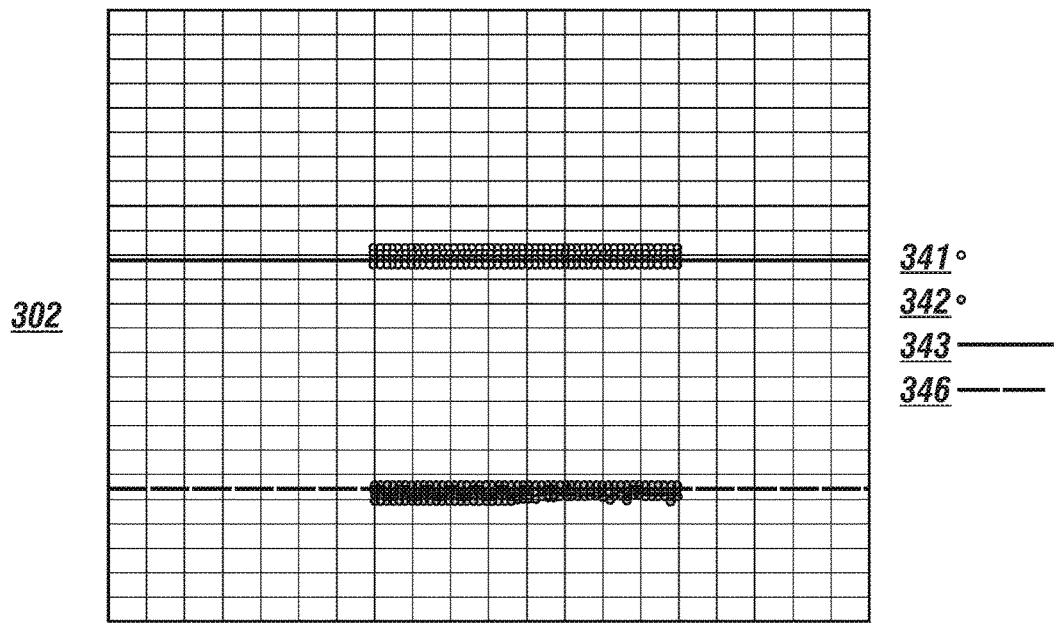

FIG. 3-4 graphically shows a seventh dataset 341 and an eighth dataset 342 that indicate a flow resistance (Pa-sec/sec) in relation to exhaust flow (1/sec), wherein the seventh and eighth datasets 341, 342 are associated with operation of an embodiment of the engine 10 described with reference to FIG. 1 employing the method 200 including the RLS signal filter 230 that is described with reference to FIG. 2. The seventh and eighth datasets 341, 342 are associated with operation of an embodiment of the engine 10 described with reference to FIG. 1 under worst-case operating conditions that are associated with the accuracy of the pressure monitoring device 30, which may include low exhaust flow and pressure conditions. The seventh and eighth datasets 341, 342 represent raw differential pressure data that has been subject the RLS signal filter 230. The flow resistance (Pa-sec/sec) is shown on the vertical axis 302 and the exhaust flow (1/sec) is shown on the horizontal axis 304. The seventh dataset 341 is related to measurement of a pressure differential between an inlet and an outlet of one of the first, second or third devices 22, 24 and 26 of the exhaust aftertreatment system 20, wherein the selected device is the second device 24 configured as an SCR catalyst. The eighth dataset 342 is related to measurement of a pressure differential between an inlet and an outlet of one of the first, second or third devices 22, 24 and 26 of the exhaust aftertreatment system 20, wherein the selected device is the second device 24 configured as a straight pipe, simulating a condition wherein the SCR catalyst has been removed. An eighth mean value 343 associated with the eighth dataset 342 are also plotted, along with corresponding eighth mean value 346 when the second device 24 configured as a straight pipe.

Under such operating conditions, which take into account accuracy of the pressure monitoring device 30, there is minimal separation between the differential pressure data indicated by the fifth and sixth datasets 331, 332. However, the separation between the differential pressure data indicated by the seventh and eighth datasets 341, 342 provides six-sigma separation therebetween, even under what are considered worst-case operating conditions.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for monitoring, via a controller, an exhaust purifying device that is fluidly coupled to an internal combustion engine, the method comprising:
   determining a pressure differential between an inlet and an outlet of the exhaust purifying device;
   determining an exhaust gas flowrate through the exhaust purifying device that is associated with operation of the internal combustion engine;
   dynamically determining, via the controller, a raw flow resistance based upon the pressure differential and the exhaust gas flowrate;
   determining an estimated flow resistance based upon the raw flow resistance; and
   evaluating the exhaust purifying device based upon the estimated flow resistance, including detecting removal of the exhaust purifying device based upon the estimated flow resistance.

2. The method of claim 1, wherein determining the estimated flow resistance based upon the raw flow resistance comprises subjecting, via the controller, the raw flow resistance to signal filtering to determine the estimated flow resistance.

3. The method of claim 2, wherein subjecting, via the controller, the raw flow resistance to signal filtering to determine the estimated flow resistance comprises executing a recursive least-square analysis of the raw flow resistance.

4. The method of claim 1, further comprising determining the pressure differential by monitoring the pressure differential between the inlet and the outlet of the exhaust purifying device via a differential pressure sensor.

5. The method of claim 1, further comprising determining the pressure differential by monitoring the pressure differential between the inlet and the outlet of the exhaust purifying device via a first pressure sensor disposed upstream relative to the exhaust purifying device and a second pressure sensor disposed downstream relative to the exhaust purifying device.

6. The method of claim 1, further comprising monitoring the pressure differential between the inlet and the outlet of the exhaust purifying device simultaneously with determining the exhaust gas flowrate associated with the change in pressure between the inlet and the outlet of the exhaust purifying device.

7. A method for monitoring an exhaust purifying device disposed in an exhaust aftertreatment system that is fluidly coupled to an internal combustion engine, the method comprising:
   monitoring a pressure differential between an inlet and an outlet of the exhaust purifying device;
   dynamically determining a raw flow resistance based upon the pressure differential;
   determining an estimated flow resistance based upon the raw flow resistance, including:
      determining a filtered flow resistance based upon the raw flow resistance, and
      resetting the estimated flow resistance to a nominal value when an absolute difference between the filtered flow resistance and the estimated flow resistance is greater than a threshold; and
   evaluating the exhaust purifying device based upon the estimated flow resistance.

8. The method of claim 7, wherein determining the estimated flow resistance based upon the raw flow resistance comprises subjecting, via a controller, the raw flow resistance to signal filtering to determine the estimated flow resistance.

9. The method of claim 8, wherein subjecting, via the controller, the raw flow resistance to signal filtering to determine the estimated flow resistance comprises executing a recursive least-square analysis of the raw flow resistance.

10. The method of claim 7, wherein evaluating the exhaust purifying device based upon the estimated flow resistance comprises detecting removal of the exhaust purifying device based upon the estimated flow resistance.

11. The method of claim 7, comprising monitoring the pressure differential between the inlet and the outlet of the exhaust purifying device via a differential pressure sensor.

12. The method of claim 7, comprising monitoring the pressure differential between the inlet and the outlet of the exhaust purifying device via a first pressure sensor disposed upstream relative to the exhaust purifying device and a second pressure sensor disposed downstream relative to the exhaust purifying device.

13. The method of claim 7, comprising monitoring the pressure differential between the inlet and the outlet of the exhaust purifying device simultaneously with determining the exhaust gas flowrate associated with the change in pressure between the inlet and the outlet of the exhaust purifying device.

* * * * *